US012792600B2

(12) United States Patent
Batra et al.

(10) Patent No.: US 12,792,600 B2
(45) Date of Patent: Nov. 10, 2026

(54) SYSTEMS AND METHODS OF INFORMATION SEARCH WITH AN AGENT

(71) Applicant: Salesforce, Inc., San Francisco, CA (US)

(72) Inventors: Tarundeep Batra, San Francisco, CA (US); Boris Aleksandrovsky, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/169,151

(22) Filed: Apr. 3, 2025

(65) Prior Publication Data

US 2026/0310662 A1 Oct. 8, 2026

(51) Int. Cl.

| | |
|---|---|
| ***G06F 16/23*** | (2019.01) |
| ***G06F 3/06*** | (2006.01) |
| ***G06F 16/245*** | (2019.01) |
| ***G06F 16/248*** | (2019.01) |
| ***H04L 67/1097*** | (2022.01) |

(52) U.S. Cl.
CPC .......... *G06F 16/245* (2019.01); *G06F 16/248* (2019.01)

(58) Field of Classification Search
CPC ............................. G06F 16/245; G06F 16/248
See application file for complete search history.

(56) References Cited

U.S. PATENT DOCUMENTS

| | | | | |
|---|---|---|---|---|
| 6,704,729 | B1 * | 3/2004 | Klein | G06F 16/9538 707/999.005 |
| 7,620,628 | B2 * | 11/2009 | Kapur | G06F 16/9535 |
| 8,498,984 | B1 * | 7/2013 | Hwang | G06F 16/9538 707/723 |
| 9,251,262 | B1 * | 2/2016 | Bunn | G06F 16/48 |
| 10,083,488 | B2 | 9/2018 | Semlani | |
| 10,860,652 | B2 * | 12/2020 | Hopkins | G06F 16/9535 |
| 11,386,478 | B1 * | 7/2022 | Jones | G06F 9/451 |
| 11,755,651 | B2 * | 9/2023 | Hopkins | G06F 16/9566 707/706 |
| 12,443,612 | B2 * | 10/2025 | Jha | G06F 16/24578 |
| 12,505,113 | B2 * | 12/2025 | Zhao | G06F 16/24578 |
| 2016/0239557 | A1 * | 8/2016 | Glover | G06F 16/3344 |
| 2020/0005375 | A1 * | 1/2020 | Sharan | G06F 3/167 |

* cited by examiner

*Primary Examiner* — Debbie M Le
(74) *Attorney, Agent, or Firm* — Butzel Long

(57) ABSTRACT

Systems and methods are provided for receiving, at an agent deployed by a server, a search query from a user for information. One or more keywords may be extracted from the received search query. A search request may be generated based on the extracted keywords. The search assistant may determine one or more information categories based on search results from the generated search request when the generated search request exceeds a predetermined number of results. The one or more information categories may be ranked based on the search results. The one or more information categories may be re-ranked based on the received search query, a distribution of the search results from the generated search request, and/or grounding data. The re-ranked one or more information categories may be transmitted to the agent to be provided to the user for selection.

22 Claims, 6 Drawing Sheets

100

SYSTEMS AND METHODS OF INFORMATION SEARCH WITH AN AGENT

BACKGROUND

Field of the Invention

This application relates to agent-mediated guided search for information, and assisting a user in reformulating a search query.

In current systems, users may provide a search query to a system, which may provide a list of search results. There are no suggestions provided by such systems to reformulate or narrow the search query when too many results are provided, or when the system produces no results for the query.

SUMMARY

In an implementation, a method may include receiving, at an agent deployed by a server, a search query from a user for information. The method may include extracting, at a search assistant of the server, one or more keywords from the received search query and generating a search request based on the extracted keywords. The method may include determining, at the search assistant of the server, one or more information categories based on search results from the generated search request when the generated search request exceeds a predetermined number of results. The method may include ranking, at the search assistant of the server, the one or more information categories based on the search results, and re-ranking the one or more information categories based on the received search query, a distribution of the search results from the generated search request, and/or grounding data. The method may include transmitting, at the search assistant of the server, the re-ranked one or more information categories to the agent to be provided to the user for selection.

In an implementation, a method may include receiving, at an agent deployed by a server, a search query from a user for information. The method may include extracting, at a search assistant of the server, one or more keywords from the received search query, and generating a search request based on the extracted keywords. The method may include determining, at the search assistant of the server, one or more information selections based on search results from the generated search request. The method may include ranking, at the search assistant of the server, the one or more information selections based on the search results, and re-ranking the one or more information selections based on at least one selected from a group consisting of: the received search query, a distribution of the search results from the generated search request, and grounding data. The method may include transmitting, at the search assistant of the server, a predetermined number of the re-ranked one or more information selections to the agent to be provided to the user.

In an implementation, a system may have a server including at least one hardware processor. The server may be configured to receive, at an agent deployed by a server, a search query from a user for information and extract, at a search assistant of the server, one or more keywords from the received search query. The server may be configured to generate, at the search assistant of the server, a search request based on the extracted keywords. The server may be configured to determine, at the search assistant of the server, one or more information categories based on search results from the generated search request when the generated search request exceeds a predetermined number of results. The server may be configured to rank, at the search assistant of the server, the one or more information categories based on the search results and re-rank the one or more information categories based on at least one selected from a group consisting of: the received search query, a distribution of the search results from the generated search request, and grounding data. The server may be configured to transmit, at the search assistant of the server, the re-ranked one or more information categories to the agent to be provided to the user for selection.

In an implementation, a system may include a server including at least one hardware processor. The server may be configured to receive, at an agent deployed by a server, a search query from a user for information. The server may be configured to retrieve, at a search assistant of the server, grounding data for the search query and extract one or more keywords from the received search query. The server may be configured to generate, at the search assistant of the server, a search request based on the extracted keywords. The server may be configured to determine, at the search assistant of the server, one or more information category recommendations based on search results from the generated search request. The server may be configured to generate, at the search assistant of the server, at least one reformulated search query based on the retrieved grounding data when the search assistant of the server receives zero search results based on the generated search request. The server may be configured to transmit, at the search assistant of the server, the at least one reformulated search query to the agent to be provided to the user for selection.

In an implementation, a system may include a server including at least one hardware processor. The server may be configured to receive, at an agent deployed by a server, a search query from a user for information. The server may be configured to extract, at a search assistant of the server, one or more keywords from the received search query and generate a search request based on the extracted keywords. The server may be configured to determine, at the search assistant of the server, one or more information selections based on search results from the generated search request. The server may be configured to rank, at the search assistant of the server, the one or more information selections based on the search results and re-rank the one or more information selections based on the received search query, a distribution of the search results from the generated search request, and/or grounding data. The server may be configured to transmitting a predetermined number of the re-ranked one or more information selections to the agent to be provided to the user.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
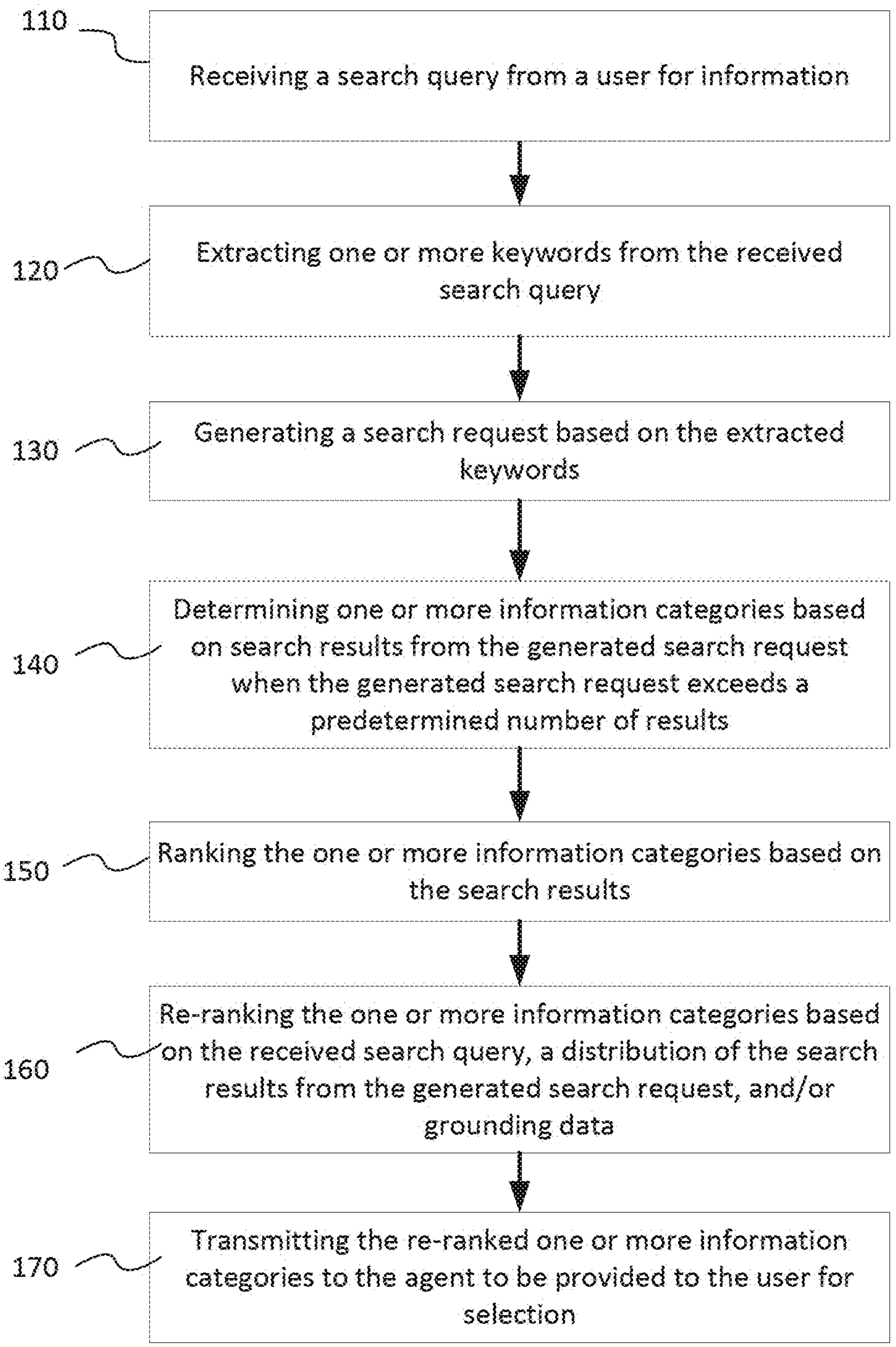
FIG. 1 shows an example method of providing information categories to a user when a user search query produces more than a predetermined number of results according to an implementation of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide an agent-mediated guided search for information, content, and/or products by a user of a website, application, or the like, and may assist the user in reformulating a search query. The guided search may be positioned in a sidebar or other location of a website, web browser, application, or other interface. The user may provide an initial query to the guided search, and the guided search may provide results and/or suggestions for refining a search query.

Implementations of the disclosed subject matter may address different search scenarios. In one implementation, information, content, and/or product recommendations may be provided in response to a search query that is specific enough to produce a predetermined number of results. In one implementation, search categories may be recommended to assist the user in narrowing a search query, and the initial search query provided by the user may produce greater than a predetermined number of results. In one embodiment, information, content, and/or products that may be the subject of the search query may not exist (i.e., the user's search query may produce zero search results), and a "search rescue" may be performed, where systems and methods of the disclosed subject matter may provide suggestions for reformulation of the search query provided by the user.

Implementations of the disclosed subject matter may provide systems and methods so that a user may quickly be able to locate the information and/or product that may be of interest, without the user getting frustrated and leaving the website, app, or software application. That is, users may not know the proper terms of what they are looking for or be able to construct a search query on their own, and the inventive concept provides assistance for refining a query or rescuing a query to produce search results for information that a user is looking for. Implementations of the disclosed subject matter may increase the speed of a user receiving relevant search results to their query, while not overwhelming the user with too many search results. Implementations of the disclosed subject matter may increase the speed of a user receiving relevant search results after an initial search produces zero results.

In some implementations, the systems and methods of the disclosed subject matter may obtain grounding data before processing a user search query, where the grounding data may include category information (e.g., a category tree) and/or index metadata for the products, content, and/or information provided by a website, application, and/or app. This grounding data may be used to assist the user in focusing a search by recommending search categories and/or query reformulations. In some implementations, the grounding data may be used, along with the user search query, to provide recommendations for information, content, and/or products.

Implementations of the disclosed subject matter may use a generative artificial intelligence (AI) and/or large language mode (LLM) to generate query reformulation recommendations, information, content, and/or product recommendations based on the user's search query, and/or category recommendations when the user's initial search query produces greater than a predetermined number of results.

Some implementations of the disclosed subject matter may re-rank categories based on the user query, distribution of results, and/or grounding data to provide category recommendations when the search produces too many results (i.e., greater than a predetermined number of results). This re-ranking of categories may provide the most relevant categories to the user to help assist the user in refining their search query. This improves over current systems, which do not assist a user in revising and/or narrowing a search query when there are greater than a predetermined number of results.

Some implementations of the disclosed subject matter may re-rank results and return N number of recommendations for information, content, and/or products. The re-ranking in this implementation may provide a re-ranked list of information, content, and/or products most relevant to the user's query. Other implementations may provide query reformulations to the user when zero search results for information, content, and/or products are returned by the system based on the user's initial search query. This implementation improves upon current systems that provide zero results to some user search queries, by providing categories to assist the user in adjusting the search query and/or by providing the user with search query reformulation suggestions so that the user may find information, content, and/or products that they are searching for.

FIG. 1 shows an example method 100 of providing information categories to a user when a user search query produces more than a predetermined number of results according to an implementation of the disclosed subject matter.

At operation 110, an agent (e.g., agent 404 shown in FIG. 4A) deployed by a server may receive a search query from a user for information. For example, the agent may be deployed by server 700 shown in FIG. 5 as part of a webpage, application, and/or app being used by the user. The webpage, application, and/or app may have a search operation where a user may enter a search query that may be received by the agent. For example, agent 404 shown in FIG. 4A may receive the search query from user 402 (which may be computer 500 shown in FIG. 5).

At operation 120, a search assistant (e.g., search assistant 406 shown in FIG. 4A) of the server may extract one or more keywords from the received search query. As described below in connection with FIG. 4A, keyword extractor 410 of the search assistant 406 may extract key words from the search query, where the keywords are those that represent what the user may be searching for, and discards any non-descriptive words.

At operation 130, the search assistant of the server may generate a search request based on the extracted keywords. In some implementations, the search request may include at least one category and/or a threshold number of search results. The at least one category may be information, content, and/or product category for the search to be performed in. The threshold number of search results may be, for example, a maximum number of results for information, content, and/or products to be returned in response to the search.

Figure 5:
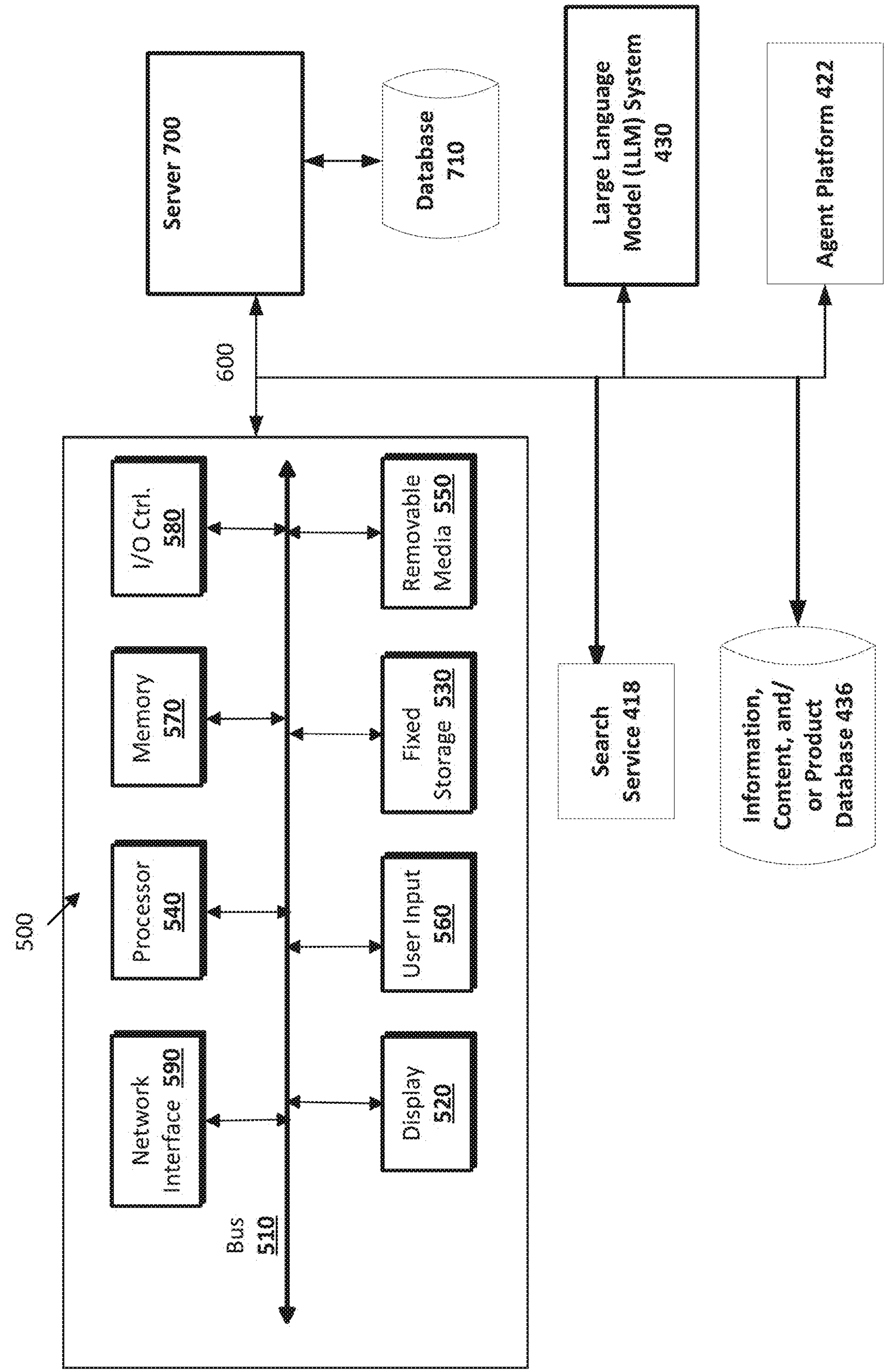
FIG. 5 shows an example computer system to perform the example methods of FIGS. 1-3, and the workflow and/or system of FIGS. 4A-4B according to implementations of the disclosed subject matter.

At operation 140, the search assistant of the server may determine one or more information categories based on search results from the generated search request when the generated search request exceeds a predetermined number of results. In some implementations, the one or more information categories may be determined by using a large language model (LLM) system communicatively coupled to the server to provide category recommendations when the generated search request exceeds a predetermined number of results. For example, large language model (LLM) system 430 may be communicatively coupled to server 700 via communications network 600 as shown in FIG. 5, where the LLM system 430 may provide category recommendations to server 700 when the generated search request exceeds the predetermined number of results.

At operation 150, the search assistant of the server may rank the one or more information categories based on the search results. That is, operation 150 may generate an initial list of categories. At operation 160, the search assistant of the server may re-rank the one or more information categories based on the received search query, a distribution of the search results from the generated search request, and/or grounding data. For example, the keywords from the search query may be used to re-rank the categories, where category results that include more of the keywords may be ranked higher. In another example, the grounding data may be a category tree for a database of information, content, and/or products, and/or or metadata for an index of the database of information, content, and/or products (e.g., organizational descriptive data for the information, content, and/or products), and the category tree and/or metadata may be used to re-rank the categories.

At operation 170, the search assistant of the server may transmit the re-ranked one or more information categories to the agent to be provided to the user for selection. The user may select one of the information categories to refine the search, and produce new search results with a ranking of information, content, and/or products that the user may be searching for.

Figure 2:
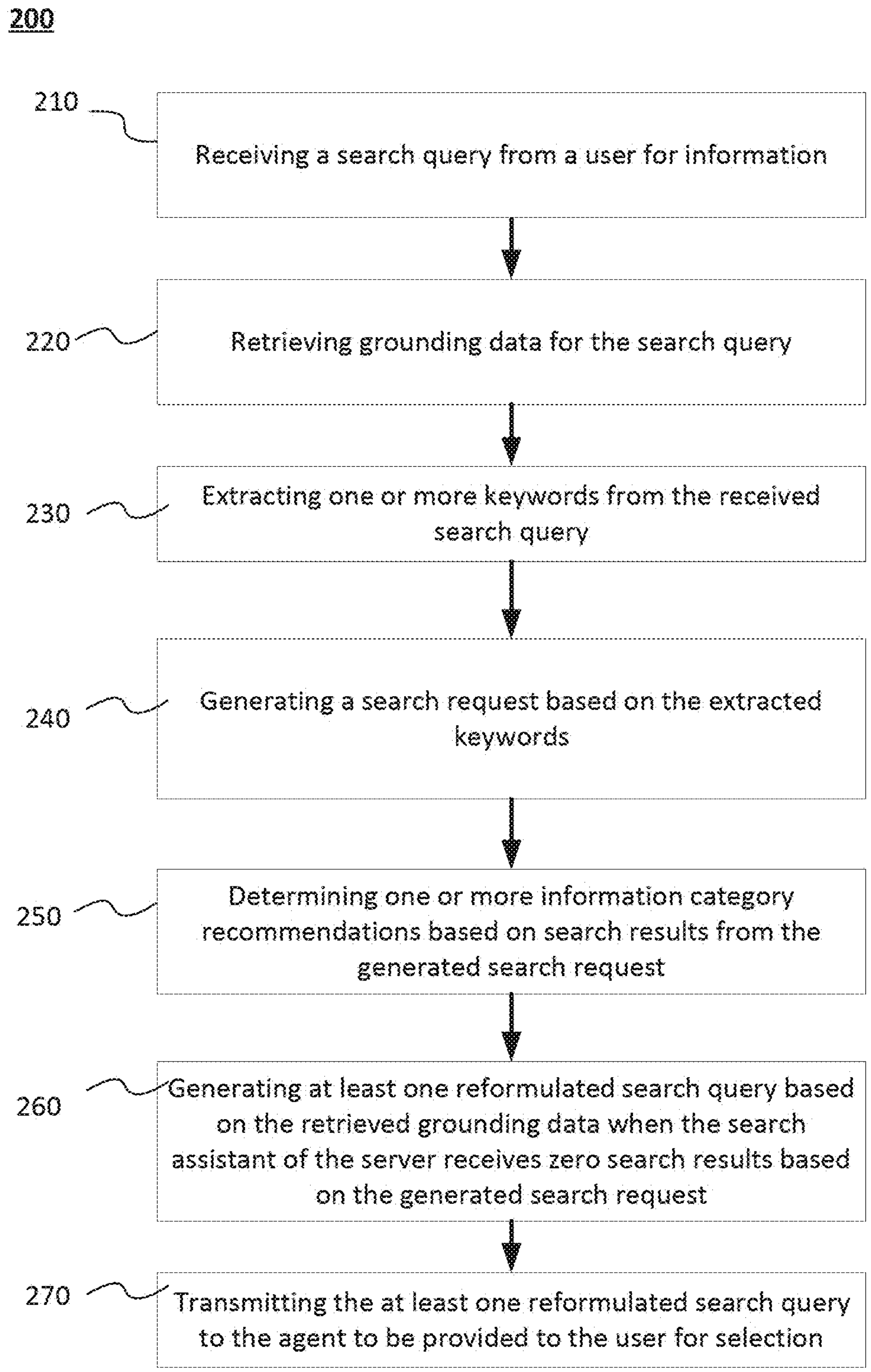
FIG. 2 shows an example method of generating a reformulated search query when a search query provided by a user produces zero search results according to an implementation of the disclosed subject matter.

FIG. 2 shows an example method 200 of generating a reformulated search query when a search query provided by a user produces zero search results according to an implementation of the disclosed subject matter.

Figure 4A:
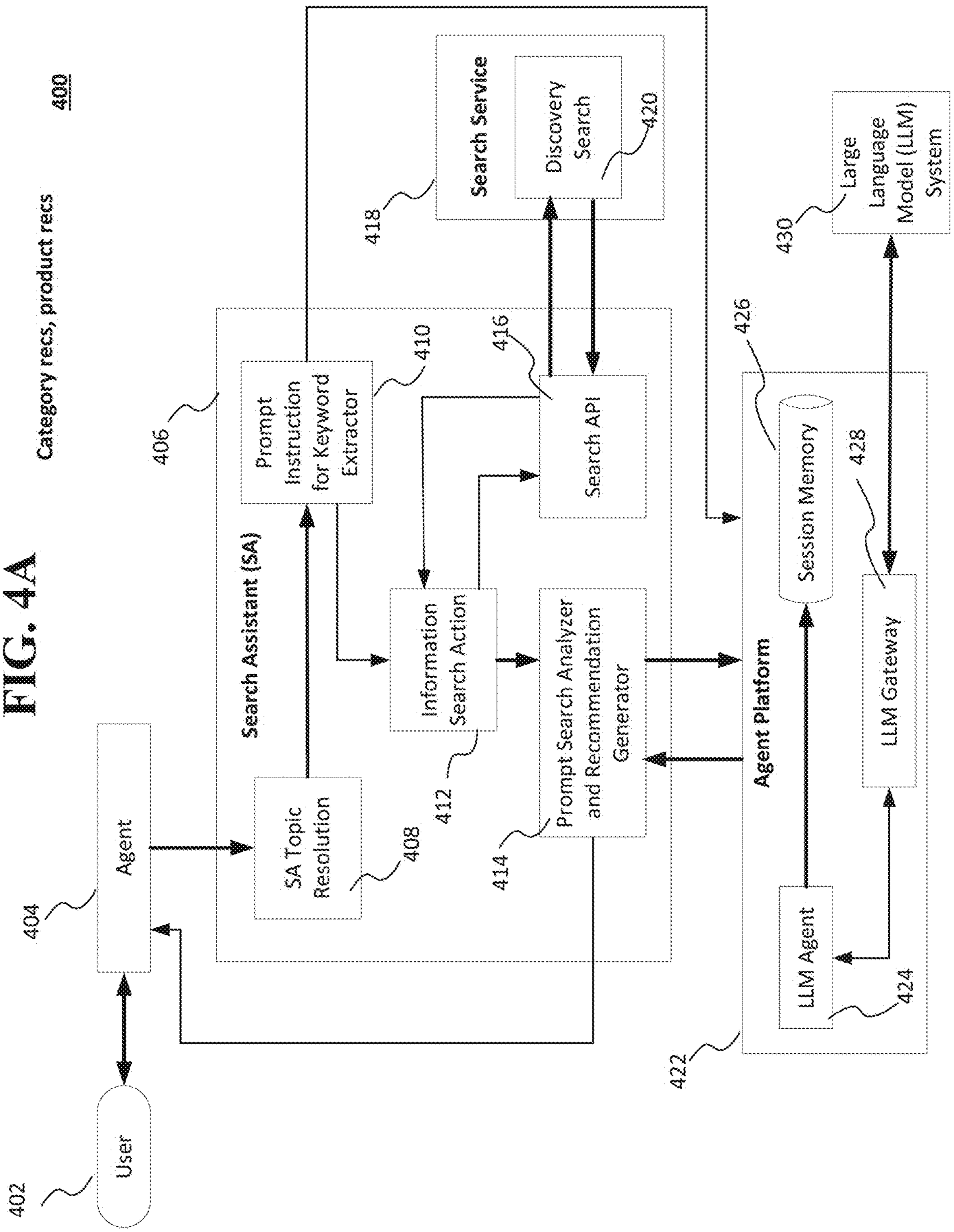
FIG. 4A shows an example system and workflow for the example methods shown in FIG. 1 and FIG. 3 according to implementations of the disclosed subject matter.
Figure 4B:
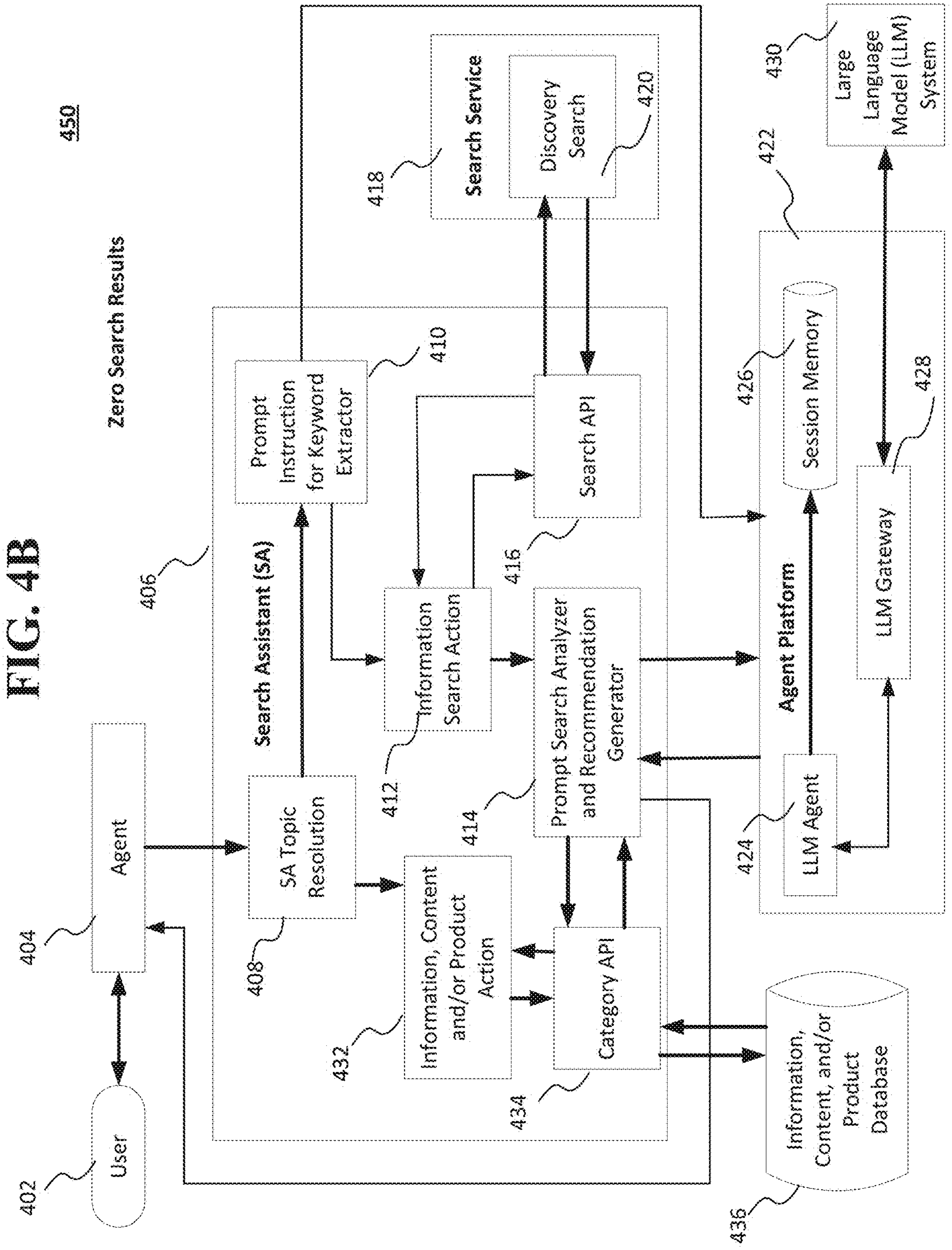
FIG. 4B shows an example system and workflow for the example method shown in FIG. 2 according to implementations of the disclosed subject matter

At operation 210, an agent deployed by a server, may receive a search query from a user for information. For example, the agent may be deployed by server 700 shown in FIG. 5 as part of a webpage, application, and/or app being used by the user. The webpage, application, and/or app may have a search operation where a user may enter a search query that may be received by the agent. For example, as shown in FIG. 4B, the agent 404 may receive a search query from user 402 (which may be computer 500 shown in FIG. 5).

At operation 220, a search assistant of the server may retrieve grounding data for the search query. For example, the search assistant 406 shown in FIG. 4B (which may be part of server 700 shown in FIG. 5) may retrieve grounding data. The grounding data may be a category tree of information products (e.g., information, content, and/or products), and/or index metadata for the information products. The index metadata may be organizational descriptive data about the information, content, and/or products that may be searchable by the system (e.g., system 450 shown in FIG. 4B, and/or the system shown in FIG. 5) as a searchable field. In some implementations, the index metadata may be facetable fields, which may be fields over which faceting, filtering, and/or counting operations may be performed by a search engine (e.g., search service 418 shown in FIG. 5). For example, facetable fields may contain color, so the user may filter by color such as "brown", "white", "black", "red", "blue", or the like, and the number of colored entities may be displayed next to the facet name. For example, if "black" is the color that is filtered for in the facetable field, the output may be [black] [56], which may indicate that there are 56 items that have the color black.

At operation 230, the search assistant of the server may extract one or more keywords from the received search query. As described below in connection with FIGS. 4A-4B, keyword extractor 410 of the search assistant 406 may extract key words from the search query, where the keywords are those that represent what the user may be searching for, and discards any non-descriptive words.

At operation 240, the search assistant of the server may generate a search request based on the extracted keywords. In some implementations, the search request may be generated by using a search category based on the category tree, and/or a threshold for a number of information products (e.g., information, content, and/or products) to be returned by the search request.

At operation 250, the search assistant of the server may generate one or more information category recommendations based on search results from the generated search request. At operation 260, the search assistant of the server may generate at least one reformulated search query based on the retrieved grounding data when the search assistant of the server receives zero search results based on the generated search request. In some implementations, the at least one reformulated search query may be generated by using a large language model (LLM) system communicatively coupled to the server to provide recommendations for reformulation of the received search query based on information products (e.g., information, content, and/or products) available and one or more categories of information products available from the category tree of information products from the grounding data. The LLM system may be LLM system 430 shown in FIGS. 4B and 5, which may be communicatively coupled to the server 700 via communications network 600 as shown in FIG. 5.

At operation 270, the search assistant of the server may transmit the at least one reformulated search query to the agent to be provided to the user for selection. In some implementations the search assistant of the server may transmit at least one justification description for the at least one reformulated search query to the agent to be provided to the user.

Figure 3:
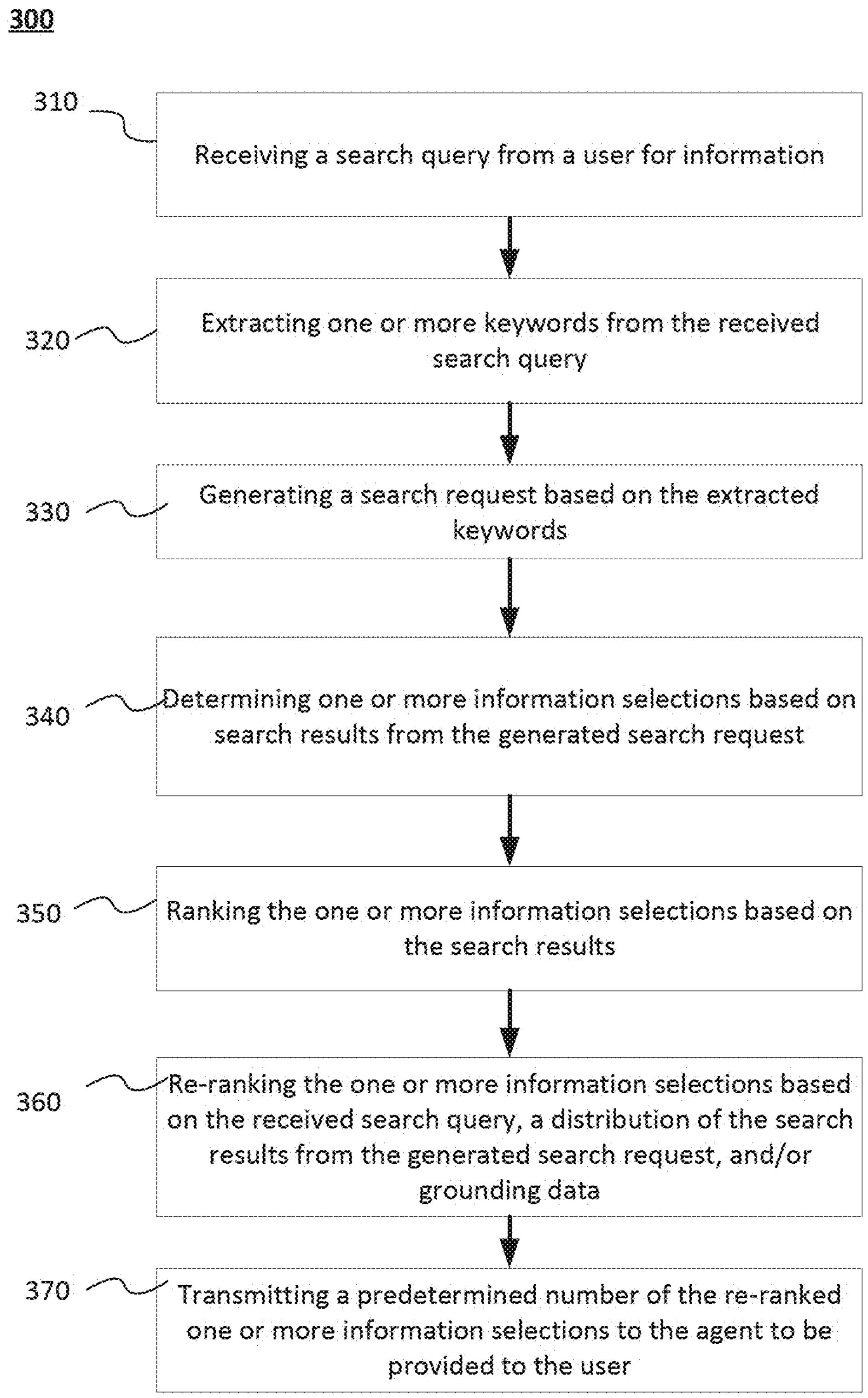
FIG. 3 shows an example method of providing ranked information according to an implementation of the disclosed subject matter.

FIG. 3 shows an example method 300 of providing ranked information according to an implementation of the disclosed subject matter. The ranked information may include a ranked list of information, content, and/or products based on a user's search query.

At operation 310, an agent deployed by a server may receive a search query from a user for information. For example, the agent may be deployed by server 700 shown in FIG. 5 as part of a webpage, application, and/or app being used by the user. The webpage, application, and/or app may have a search operation where a user may enter a search query that may be received by the agent. For example, as shown in FIG. 4A, the agent 404 may receive a search query from user 402 (which may be computer 500 shown in FIG. 5).

At operation 320, a search assistant of the server may extract one or more keywords from the received search query. As described below in connection with FIGS. 4A-4B, keyword extractor 410 of the search assistant 406 may extract key words from the search query, where the keywords are those that represent what the user may be searching for, and discards any non-descriptive words.

At operation 330, the search assistant of the server may generate a search request based on the extracted keywords. At operation 340, the search assistant of the server may determine one or more information selections based on search results from the generated search request. In some implementations, the determining the one or more information selections may include using a large language model (LLM) system communicatively coupled to the search assistant of the server to determine the one or more information selections based on search results from the generated search request. The LLM system may be LLM system 430 shown in FIGS. 4A and 5, which may be communicatively coupled to the server 700 via communications network 600 as shown in FIG. 5.

At operation 350, the search assistant of the server may rank the one or more information selections based on the search results. At operation 360, the search assistant of the server may re-rank the one or more information selections based on the received search query, a distribution of the search results from the generated search request, and/or grounding data. For example, the keywords from the search query may be used to re-rank the information selections, where information selection results that include more of the keywords may be ranked higher. In another example, the grounding data may be a category tree for a database of information, content, and/or products, and/or or metadata for an index of the database of information, content, and/or products (e.g., organizational descriptive data for the information, content, and/or products).

At operation 370, the search assistant of the server may transmit a predetermined number of the re-ranked one or more information selections to the agent to be provided to the user. In some implementations, the transmitting the re-ranked one or more information recommendations may include transmitting one or more reasons for the re-ranking of the one or more information recommendations.

FIG. 4A shows an example system and workflow 400 for the example method 100 shown in FIG. 1 and example method 300 shown in FIG. 3 according to implementations of the disclosed subject matter.

When performing method 100 with the system and workflow 400 of FIG. 4A, the user 402 (e.g., using computer 500 shown in FIG. 5) may provide a search query to agent 404. The user may start a session and/or interaction with agent 404, and may provide a search query for information, content, and/or products when the agent session has been initiated. The agent 404 may provide the search query to the search assistant (SA) 406. The search assistant (SA) topic resolution 408 of the search assistant 406 may receive the search query, and may provide it to keyword extractor 410. The keyword extractor 410 may extract key words from the search query, where the keywords are those that represent what the user may be searching for, and may discard any non-descriptive words. The extracted keywords may be provided to the information search action 412, which may issue a search request based on the extracted keywords. The search request may be provided to the search API (application program interface) 416, which may be communicatively coupled to the discovery search 420 of search service 418, which may perform the search based on the keywords. In some implementations, the search request may include a category of information, content, and/or products, and may include a threshold number of results. The results of the search performed by the discovery search 420 may be provided to the information search action 412 via the search API 416.

The information search action 412 may analyze the search results, and may determine one or more categories that may be used to help narrow the user's search query. The determined categories may be provided from the information search action 412 to the prompt result analyzer and recommendation generator 414, which may be communicatively coupled to the agent platform 422. LLM agent 424 may receive the categories, and determine if there are results from earlier sessions in the session memory 426 that re-rank the categories. If not, the LLM agent 424 may use the LLM gateway 428 to communicate with the LLM system 430 to re-rank the categories determined by the prompt result analyzer and recommendation generator 414. The results of the re-ranking may be provided from the agent platform 422 to prompt result analyzer and recommendation generator 414, which may provide them to agent 404, and then to the user 402. The user may select at least one of the re-ranked categories to help refine their initial search query to reduce the number of results produced by the query.

In an example using the method 100 and the system and workflow 400, the agent 404 may receive the search query "breathable cotton novelty t-shirts for summer" from the user 402. As described above, the search assistant 406 may process this search query using the search service 418, agent platform 422, and LLM system 430 to provide category recommendations to assist the user in refining the search query. For example, the agent 404 may transmit the following to user 402 (e.g., to be displayed on display 520 of computer 500 shown in FIG. 5): Here are some category recommendations that might help you find breathable cotton novelty t-shirts for summer 1. Category Name: Novelty & More
   This category includes various novelty items, which would include novelty t-shirts
2. Category Name: Men
   This category includes clothing for men, which would include t-shirts
3. Category Name: Women
   This category includes clothing for women, which would include t-shirts Feel free to explore these categories to find the perfect breathable cotton novelty t-shirt for summer!

In this example, the user 402 may select one of the categories provided by agent 404, and conduct a search using at least the selected category. In some implementations, the updated search may include the selected category and the keywords from the initial search query.

When performing method 300 with the system and workflow 400 of FIG. 4A, the operations may be similar to those described above, but the information search action 412 may analyze the search results, and may determine information, content, and/or products based on the performed search using keywords, rather than one or more categories that may be used to help narrow the user's search query as is done when performing operation 100. With method 300, the determined information, content, and/or products may be provided from the information search action 412 to the prompt result analyzer and recommendation generator 414, which may be communicatively coupled to the agent platform 422. LLM agent 424 may receive the information, content, and/or products, and determine if there are results from earlier sessions in the session memory 426 that re-rank the information, content, and/or products. If not, the LLM agent 424 may use the LLM gateway 428 to communicate with the LLM system 430 to re-rank the information, content, and/or products determined by the prompt result analyzer and recommendation generator 414. The results of the re-ranking may be provided from the agent platform 422 to prompt result analyzer and recommendation generator 414, which may provide them to the user 402 via the agent 404. The user may select at least one of the re-ranked information, content, and/or products.

In an example using the method 300 and the system and workflow 400, the agent 404 may receive the search query "women's asymmetrical sandals" from the user 402. As described above, the search assistant 406 may process this search query using the search service 418, agent platform 422, and/or LLM system 430 to provide category recommendations to assist the user in refining the search query. For example, the agent 404 may transmit the following to user 402 (e.g., to be displayed on display 520 of computer 500 shown in FIG. 5):

Here are the best matching product recommendations:

1. Product Name: Gentle Sandals by XYZ Footwear, Women's Lavern Asymmetrical Slingback Sandal
   Price: $112
   Description: Asymmetrical Slingback sandal with hook and loop closure
   Click here to purchase: [Link to Gentle Sandals by XYZ Footwear]
   Why you should buy this?
      Matched attributes: Product Type: Sandal; Style: Asymmetrical; Demographic: Women's
      Missing attributes: None
      Reason for final ranking: the product matches all the requested attributes
      Relevance score: 9

In this example, the user 402 may select the link to Gentle Sandals by XYZ Footwear to see additional information about the product and/or to purchase the product in a size the user would like. Although only one product recommendation is shown in this example, there may be a plurality of products in a ranked list, where the ranking may be based on the matching of the attributes as determined by the keywords in the search query.

FIG. 4B shows an example system and workflow 450 for the example method 200 shown in FIG. 2 according to implementations of the disclosed subject matter.

When performing method 200 with the system and workflow 400 of FIG. 4B, the user 402 may provide a search query to agent 404. The user may start a session and/or interaction with agent 404, and may providing a search query for information, content, and/or products when the agent session has been initiated. The agent 404 may provide the search query to the search assistant (SA) 406.

The SA topic resolution 408 of the search assistant 406 may commence an information, content and/or product action 432 based on the received search query, and may retrieve categories (e.g., a category tree) for the content, information from information, content and/or product database 436 via category API 434. The system 450 may use the retrieved categories as grounding data to assist the user in re-formulating a search query that returns zero results, as discussed below.

The search assistant (SA) topic resolution 408 may provide the received search query to keyword extractor 410. The keyword extractor 410 may extract key words from the search query, where the keywords are those that represent what the user may be searching for, and may discard any non-descriptive words. The extracted keywords may be provided to the information search action 412, which may issue a search request based on the extracted keywords. The search request may be provided to the search API 416, which may be communicatively coupled to the discovery search 420 of search service 418, which may perform the search based on the keywords. In some implementations, the search request may include a category of information, content, and/or products, and may include a threshold number of results. The results of the search performed by the discovery search 420 may be zero results, which provided to the information search action 412 via the search API 416.

Based on the zero search results, the information search action 412 may analyze the search query and the categories (e.g., category tree) from the grounding data to determine one or more user query reformulations. The determined categories may be provided from the information search action 412 and/or the product category API 434 to the prompt result analyzer and recommendation generator 414, which may be communicatively coupled to the agent platform 422. LLM agent 424 may receive the categories, as well as extracted keywords from the keyword extractor 410, and determine if there are results for reformulation of the search query from earlier sessions in the session memory 426. If not, the LLM agent 424 may use the LLM gateway 428 to communicate with the LLM system 430 to generate reformulations of the user's search query that may help the user find information, content, and/or products that the user is interested in. The reformulations of the search query may be provided from the agent platform 422 to prompt result analyzer and recommendation generator 414, which may provide them to agent 404, and then to the user 402. The user may select at least one of the reformulations of the search query to assist the user in finding information, content, and/or products of interest.

In an example using the method 200 and the system and workflow 450, the agent 404 may receive the search query "jitter" from the user 402. As described above, the search assistant 406 may process this search query using the search service 418, agent platform 422, and LLM system 430 to provide category recommendations to assist the user in refining the search query. For example, the agent 404 may transmit the following to user 402 (e.g., computer 500 shown in FIG. 5):

Unfortunately, we were unable to find any relevant products with the search term "jitter drink". Here are new search term recommendations that could help you find what you need. Please select one to focus your search:

1. New search term: energy drinks
   Broader category that includes energy drink products, such as Red Bull™, Celsius™, C4™, Fast Twitch™, and the like.
2. New search term: Drinks
   General category that includes all types of beverages
3. New search term: coffee
   Alternative caffeinated beverage option In this example, the user 402 may select one of the new search terms provided by agent 404, and conduct a new search with the selected search term.

Implementations of the disclosed subject matter may be implemented in and used with a variety of component and network architectures. FIG. 5 is an example computer 500 may allow a user to interact with the server 700 (or one or more other servers communicatively coupled to communications network 600) that is suitable for the operations detailed in FIGS. 1-4B, and which may include system 400 shown in FIG. 4A and system 450 shown in FIG. 4B. Although one server 700 is shown in FIG. 5, there may be a plurality of servers communicatively coupled to communications network 600 to perform the operations detailed in FIGS. 1-3 and the workflow of FIGS. 4A-4B. The computer 500 may be a single computer in a network of multiple computers.

In some implementations, the computer 500 may communicate with and may be used to receive one or more responses generated by: server 700; database 710; large language model (LLM) system 430; agent platform 422; information, content, and/or product database 436; and/or search service 418 via communications network 600. The server 700, LLM system 430, agent platform 422, and/or search service 418 may be one or more hardware servers, virtual machines, cloud servers, databases, clusters, application servers, neural network systems, processors, devices, computers, or the like. The database 710 and/or database 436 may use any suitable combination of any suitable volatile and non-volatile physical storage mediums, including, for example, hard disk drives, solid state drives, optical media, flash memory, tape drives, registers, and random access memory, or the like, or any combination thereof. The database 710 may store data, such as tenant data for an application, user data, user profile data, metadata, application data, and the like. Information, content, and/or product database 436 may store category information (e.g., category trees) and/or index metadata for information, content, and/or products for a website, application, or app, and/or may store the information, content, and/or products related to the categories and index metadata.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random-access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks. The service resource 404 and/or one or more user devices 750 may have components that are similar to the computer 500 described above.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "extracting", "generating", "determining", "ranking", "re-ranking", "transmitting", "retrieving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general-purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

In various implementations, the models and/or modules described herein may be classification, predictive, generative, conversational, or another form of artificial intelligence (AI) technology, such as AI model(s), agents, large language models (LLMs), etc., implementing one or more forms of machine learning, a neural network, statistical modeling, deep learning, automation, natural language processing, or other similar technology. The AI technology may be included as part of a network or system comprising a hardware- or software-based framework for training, processing, fine-tuning, or performing any other implementation steps. Furthermore, the AI technology may include a hardware- or software-based framework that performs one or more functions, such as retrieving, generating, accessing, transmitting, etc. The AI technology may be implemented by a computer including a processor or a central processing unit (CPU) coupled to one or more storage system(s), non-transitory machine readable medium(s), memory, or other machine readable storage medium(s).

Moreover, the AI technology may be trained or fine-tuned using supervised, unsupervised, or other AI training techniques. In various implementations, the AI technology may be trained or fine-tuned using a set of general datasets or a set of datasets directed to a particular field or task. Additionally or alternatively, the AI technology may be intermittently updated at a set interval or in real time based on resulting output or additional data to further train the AI technology. The AI technology may offer a variety of capabilities including text, audio, image, and other content generation, translation, summarization, classification, prediction, recommendation, time-series forecasting, searching, matching, pairing, and more. These capabilities may be provided in the form of output produced by the AI technology in response to a particular prompt or other input. Furthermore, the AI technology may implement Retrieval-Augmented Generation (RAG) or other techniques after training or fine-tuning by accessing a set of documents or knowledge base directed to a particular field or website other than the training or fine-tuning data to influence the AI technology's output with the set of documents or knowledge base.

To further guide and train output of the AI technology, a plurality of input prompts may be provided to the AI technology for the purpose of eliciting particular responses. In various implementations, the plurality of input prompts may correspond to the particular field or task to which the AI technology is trained. Additionally, the AI technology may be implemented along with a plurality of additional AI technologies. For example, a first AI model may produce a first output, which is used as input for a second AI model to produce a second output. These AI technologies may be used in succession of one another, in parallel with another, or a combination of both. Furthermore, the AI technologies may be merged in a variety of implementations, for example, by bagging, boosting, stacking, etc. the AI technologies.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:

receiving, at an agent deployed by a server, a search query from a user for information;

extracting, at a search assistant of the server, one or more keywords from the received search query;

generating, at the search assistant of the server, a search request based on the extracted keywords;

determining, at the search assistant of the server, one or more information categories based on search results from the generated search request when the generated search request exceeds a predetermined number of results;

ranking, at the search assistant of the server, the one or more information categories based on the search results;

re-ranking, at the search assistant of the server, the one or more information categories based on grounding data that includes index metadata for a database of information products and at least one selected from a group consisting of: the received search query, and a distribution of the search results from the generated search request, wherein the index metadata is used by the server to re-rank the one or more information categories; and transmitting, at the search assistant of the server, the re-ranked one or more information categories to the agent to be provided to a device of the user for display and selection.

2. The method of claim 1, wherein the search request further comprises at least one selected from a group consisting of: at least one category, and a threshold number of search results.

3. The method of claim 1, wherein the determining the one or more information categories comprises using a large language model (LLM) system communicatively coupled to the server to provide category recommendations when the generated search request exceeds a predetermined number of results.

4. A method comprising:

receiving, at an agent deployed by a server, a search query from a user for information;

retrieving, at a search assistant of the server, grounding data for the search query, wherein the grounding data includes index metadata for a database of information products;

extracting, at the search assistant of the server, one or more keywords from the received search query;

generating, at the search assistant of the server, a search request based on the extracted keywords;

determining, at the search assistant of the server, one or more information category recommendations based on search results from the generated search request;

generating, at the search assistant of the server, at least one reformulated search query based on the information products that are determined to be available using the retrieved grounding data when the search assistant of the server receives zero search results based on the generated search request; and transmitting, at the search assistant of the server, the at least one reformulated search query to the agent to be provided to a device of the user for display and selection.

5. The method of claim 4, wherein the grounding data comprises at least one selected from a group consisting of: a category tree of information products, and index metadata for the information products.

6. The method of claim 4, wherein the generating the at least one reformulated search query comprises using a large language model (LLM) system communicatively coupled to the server to provide recommendations for reformulation of the received search query based on information products available and one or more categories of information products available from the category tree of information products from the grounding data.

7. The method of claim 4, wherein the generating a search request further comprises at least one selected from a group consisting of: a search category based on the category tree, and a threshold for a number of information products to be returned by the search request.

8. The method of claim 4, further comprising:

transmitting, at the search assistant of the server, at least one justification description for the at least one reformulated search query to the agent to be provided to the user.

9. A method comprising:

receiving, at an agent deployed by a server, a search query from a user for information;

extracting, at a search assistant of the server, one or more keywords from the received search query;

generating, at the search assistant of the server, a search request based on the extracted keywords;

determining, at the search assistant of the server, one or more information selections based on search results from the generated search request;

ranking, at the search assistant of the server, the one or more information selections based on the search results;

re-ranking, at the search assistant of the server, the one or more information selections based on grounding data that includes index metadata for a database of information products and at least one selected from a group consisting of: the received search query, and a distribution of the search results from the generated search request, wherein the index metadata is used by the server to re-rank the one or more information categories; and transmitting, at the search assistant of the server, a predetermined number of the re-ranked one or more information selections to the agent to be provided to a device of the user for display.

10. The method of claim 9, wherein the transmitting the re-ranked one or more information recommendations further comprises:

transmitting one or more reasons for the re-ranking of the one or more information recommendations.

11. The method of claim 9, wherein the determining the one or more information selections comprises using a large language model (LLM) system communicatively coupled to the search assistant of the server to determine the one or more information selections based on search results from the generated search request.

12. A system comprising:

a server including at least one hardware processor, the server configured to:

receive, at an agent deployed by a server, a search query from a user for information;

extract, at a search assistant of the server, one or more keywords from the received search query;

generate, at the search assistant of the server, a search request based on the extracted keywords;

determine, at the search assistant of the server, one or more information categories based on search results from the generated search request when the generated search request exceeds a predetermined number of results;

rank, at the search assistant of the server, the one or more information categories based on the search results;

re-rank, at the search assistant of the server, the one or more information categories based on grounding data that includes index metadata for a database of information products and at least one selected from a group consisting of: the received search query, and a distribution of the search results from the generated search request, wherein the index metadata is used by the server to re-rank the one or more information categories; and transmit, at the search assistant of the server, the re-ranked one or more information categories to the agent to be provided to a device of the user for display selection.

13. The system of claim 12, wherein the search request further comprises at least one selected from a group consisting of: at least one category, and a threshold number of search results.

14. The system of claim 12, wherein the server determines the one or more information categories by using a large language model (LLM) system communicatively coupled to the server to provide category recommendations when the generated search request exceeds a predetermined number of results.

15. A system comprising:
- a server including at least one hardware processor, the server configured to:
  - receive, at an agent deployed by a server, a search query from a user for information;
  - retrieve, at a search assistant of the server, grounding data for the search query, wherein the grounding data includes index metadata for a database of information products;
  - extract, at a search assistant of the server, one or more keywords from the received search query;
  - generate, at the search assistant of the server, a search request based on the extracted keywords;
  - determine, at the search assistant of the server, one or more information category recommendations based on search results from the generated search request;
  - generate, at the search assistant of the server, at least one reformulated search query based on the information products that are determined to be available using the retrieved grounding data when the search assistant of the server receives zero search results based on the generated search request; and
  - transmit, at the search assistant of the server, the at least one reformulated search query to the agent to be provided to a device of the user for display and selection.

16. The system of claim 15, wherein the grounding data comprises at least one selected from a group consisting of: a category tree of information products, and index metadata for the information products.

17. The system of claim 15, wherein the server generates the at least one reformulated search query by using a large language model (LLM) system communicatively coupled to the server to provide recommendations for reformulation of the received search query based on information products available and one or more categories of information products available from the category tree of information products from the grounding data.

18. The system of claim 15, wherein the server generates a search request by using at least one selected from a group consisting of: a search category based on the category tree, and a threshold for a number of information products to be returned by the search request.

19. The system of claim 15, wherein the server is further configured to:
- transmit, at the search assistant of the server, at least one justification description for the at least one reformulated search query to the agent to be provided to the user.

20. A system comprising:
- a server including at least one hardware processor, the server configured to:
  - receive, at an agent deployed by a server, a search query from a user for information;
  - extract, at a search assistant of the server, one or more keywords from the received search query;
  - generate, at the search assistant of the server, a search request based on the extracted keywords;
  - determine, at the search assistant of the server, one or more information selections based on search results from the generated search request;
  - rank, at the search assistant of the server, the one or more information selections based on the search results;
  - re-rank, at the search assistant of the server, the one or more information selections based on grounding data that includes index metadata for a database of information products and at least one selected from a group consisting of: the received search query, and a distribution of the search results from the generated search request, wherein the index metadata is used by the server to re-rank the one or more information categories; and
  - transmit a predetermined number of the re-ranked one or more information selections to the agent to be provided to the user.

21. The system of claim 20, wherein the server transmits the re-ranked one or more information recommendations by transmitting one or more reasons for the re-ranking of the one or more information recommendations.

22. The system of claim 20, wherein the server determines the one or more information selections by using a large language model (LLM) system communicatively coupled to the search assistant of the server to determine the one or more information selections based on search results from the generated search request.

* * * * *